US011519063B2

(12) United States Patent
Gao

(10) Patent No.: US 11,519,063 B2
(45) Date of Patent: Dec. 6, 2022

(54) METHODS FOR IN SITU FORMATION OF DISPERSOIDS STRENGTHENED REFRACTORY ALLOY IN 3D PRINTING AND/OR ADDITIVE MANUFACTURING

(71) Applicant: Youping Gao, Thousand Oaks, CA (US)

(72) Inventor: Youping Gao, Thousand Oaks, CA (US)

( * ) Notice: Subject to any disclaimer, the term of this patent is extended or adjusted under 35 U.S.C. 154(b) by 208 days.

(21) Appl. No.: 17/024,625

(22) Filed: Sep. 17, 2020

(65) Prior Publication Data

US 2021/0079511 A1 Mar. 18, 2021

Related U.S. Application Data

(60) Provisional application No. 62/901,633, filed on Sep. 17, 2019.

(51) Int. Cl.

| | |
|---|---|
| ***C23C 8/10*** | (2006.01) |
| ***B33Y 10/00*** | (2015.01) |
| ***B23K 31/00*** | (2006.01) |
| ***B33Y 70/00*** | (2020.01) |
| ***C23C 8/24*** | (2006.01) |
| ***B33Y 40/10*** | (2020.01) |

(52) U.S. Cl.

CPC ................ *C23C 8/10* (2013.01); *B23K 31/00* (2013.01); *B33Y 10/00* (2014.12); *B33Y 40/10* (2020.01); *B33Y 70/00* (2014.12); *C23C 8/24* (2013.01)

(58) Field of Classification Search

CPC .. C23C 8/10; C23C 8/24; B23K 31/00; B33Y 10/00; B33Y 40/10; B33Y 70/00

See application file for complete search history.

(56) References Cited

U.S. PATENT DOCUMENTS

| | | | | |
|---|---|---|---|---|
| 4,921,531 | A * | 5/1990 | Nagle | C01B 13/324 423/440 |
| 5,049,355 | A * | 9/1991 | Gennari | C22C 32/0031 419/46 |
| 2018/0193916 | A1* | 7/2018 | Lou | B23K 15/10 |

* cited by examiner

*Primary Examiner* — Anthony J Zimmer
*Assistant Examiner* — Nazmun Nahar Shams
(74) *Attorney, Agent, or Firm* — The Weintraub Group P.L.C.

(57) ABSTRACT

Methods of fabricating objects using additive manufacturing are provided. The methods create in situ dispersoids within the object. The methods are used with refractory alloy powders which are pretreated to increase the oxygen content to between 500 ppm and 3000 ppm or to increase the nitrogen content to between 250 ppm and 1500 ppm. The pretreated powders are then formed into layers in an environmentally controlled chamber of an additive manufacturing machine. The environmentally controlled chamber is adjusted to have between 500 ppm and 200 ppm oxygen. The layer of pretreated powder is then exposed to a transient moving energy source for melting and solidifying the layer; and creating in situ dispersoids in the layer.

10 Claims, 4 Drawing Sheets

Fig. 1

METHODS FOR IN SITU FORMATION OF DISPERSOIDS STRENGTHENED REFRACTORY ALLOY IN 3D PRINTING AND/OR ADDITIVE MANUFACTURING

CROSS-REFERENCE TO RELATED APPLICATION

This patent document claims the benefit of and priority to U.S. Provisional Application Ser. No. 62/901,633, filed Sep. 17, 2019, the contents of which are incorporated herein by reference in their entirety and are to be considered a part of the specification.

FIELD

The present invention generally relates to processes for additive manufacturing for producing dispersoids strengthened materials (e.g., oxides and/or nitrides enriched powders and/or processed additives under enriched oxygen and/or nitrogen), and additively manufacturing materials produced by these processes.

BACKGROUND

In general, refractory alloys are mostly solid solution strengthened (substitutional strengthened) and are very sensitive to contamination from interstitial elements such as oxygen, nitrogen and carbon, to name a few. The most popular refractory alloy in the aerospace industry is Niobium Alloy C103 (Nb-10Hf-1Ti). Other refractory alloys include but are not limited to Niobium (Nb), Rhenium (Re), Tantalum (Ta), Molybdenum (Mo) and Tungsten (W) to name a few. When concentrations of interstitial elements are above certain limits, such as $O_2$<350 ppm and/or $N_2$<100 ppm, the refractory alloys properties degrade significantly. For example, refractory alloys may experience embrittlement and/or loss of ductility, which will significantly degrade the material.

The main reason for the degradation of refractory alloys in the face of contamination is due to the following: A) The interstitial elements did not form stable oxides and/or nitrides; B) The interstitial elements are not in the size range where cohesive strengthening can be provided; and/or C) The interstitial elements are not distributed evenly but laced in the grain boundary, which weakens the overall materials properties. Accordingly, refractory alloys have very tight, not to exceed, interstitial contents tolerances in the wrought form.

Solid solution strengthened refractory alloys can be, in theory, strengthened by dispersoids. However, in reality, it has never been achieved because of the difficulty to distribute proper dispersoids in the melting process, the poor low-temperature workability of refractory alloys, which limit its ability to homogenize, and the high temperature oxidation tendency. These qualities all make the process of strengthening refractory alloys using dispersoids impossible to achieve.

Accordingly, current practice in the art of additive manufacturing is to maintain oxygen and contaminants within the sintering chamber at or below certain levels. For example, EP3368312 teaches that a gas management system maintains gaseous oxygen within the interior of the enclosure at or below a limiting oxygen concentration equivalent to the atmospheric level. This is thought to be important for many reasons but mostly to prevent contamination. References like U.S. Patent Publication 2018/0126650 point out that oxygen and or nitrogen will potentially contaminate the additive manufacturing process.

Additive manufacturing is a rapidly growing industry and there is a need to be able to create stronger materials and alloys that can be used with the additive manufacturing process. To this end, there is a great need to figure out methods and processes to create stronger parts using the additive manufacturing process. Stronger parts typically result from stronger alloys and thus, there is a need for stronger alloys, particularly stronger refractory alloys, for use with the additive manufacturing process.

SUMMARY OF THE EMBODIMENTS

Objects of the present patent document are to provide improved methods of manufacturing powders for use in additive manufacturing and improved methods for manufacturing objects using additive manufacturing.

In preferred embodiments, the methods of fabricating an object using additive manufacturing comprise selecting a refractory alloy powder from group consisting of Niobium, Rhenium, Tantalum, Molybdenum, and alloys.

Once a powder is selected, the powder is pretreated to increase the oxygen content to between 500 ppm and 3000 ppm or to increase the nitrogen content to between 250 ppm and 1500 ppm or both.

After the powder is pretreated, a layer of the refractory alloy powder is created in an environmentally controlled chamber of an additive manufacturing machine. The environment is controlled in the chamber to be between 500 ppm and 2000 ppm oxygen. Then the layer is exposed to a transient moving energy source for melting and solidifying the layer. Finally, dispersoids are formed in situ in the layer with diameters between 1 micron and 10 microns.

In preferred embodiments, the environmentally controlled chamber may also be adjusted to be between 250 ppm and 1000 ppm nitrogen.

BRIEF DESCRIPTION OF THE DRAWINGS

FIG. 1 illustrates an extremely close up optical image of the microstructure of annealed Nb C103 (wrought materials).

DETAILED DESCRIPTION OF THE PREFERRED EMBODIMENTS

Despite the fact that, it is known that the inclusion of interstitial elements causes, contamination in refractory alloys, the present inventor has appreciated that if done correctly, elevated levels of contamination from the interstitial elements such as oxygen, nitrogen and carbon can actually provide a benefit in the additive manufacturing process.

By intentionally adding oxygen and/or nitrogen above the typical specified limit, for example, double the industry standard oxygen content, the contaminants create oxides and/or nitrides dispersoids that can be distributed evenly throughout the body of additively produced hardware.

The addition of homogenous dispersoids creates a stable microstructure at elevated temperatures. FIG. 1 illustrates an extremely close up optical image of the microstructure of annealed Nb C103 (wrought material).

Figure 2:
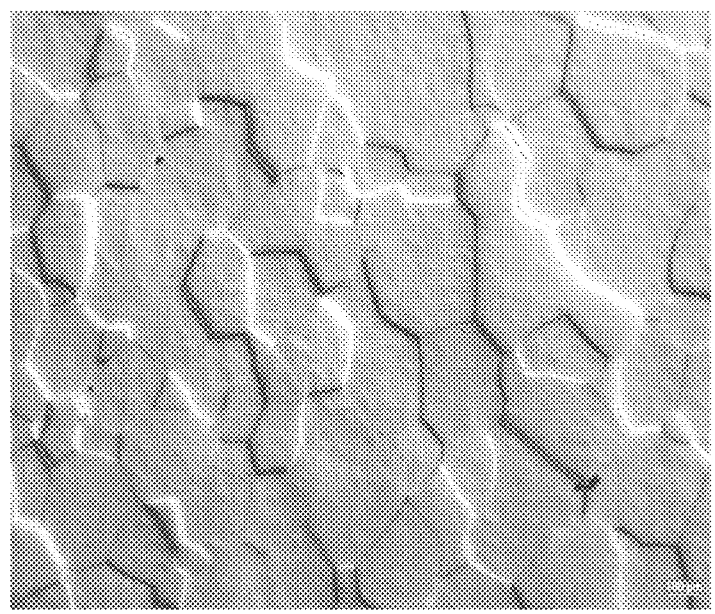
FIG. 2. illustrates an extremely close up optical image of the microstructure of Nb C103 after heating at 2,900° F. for two hours.

FIG. 2. illustrates an extremely close up optical image of the microstructure of Nb C103 after heating at 2,900° F. for two hours. As may be seen in FIG. 2, the exposure to heat creates significant grain coarsening, grain growth, in the wrought material.

Figure 3:
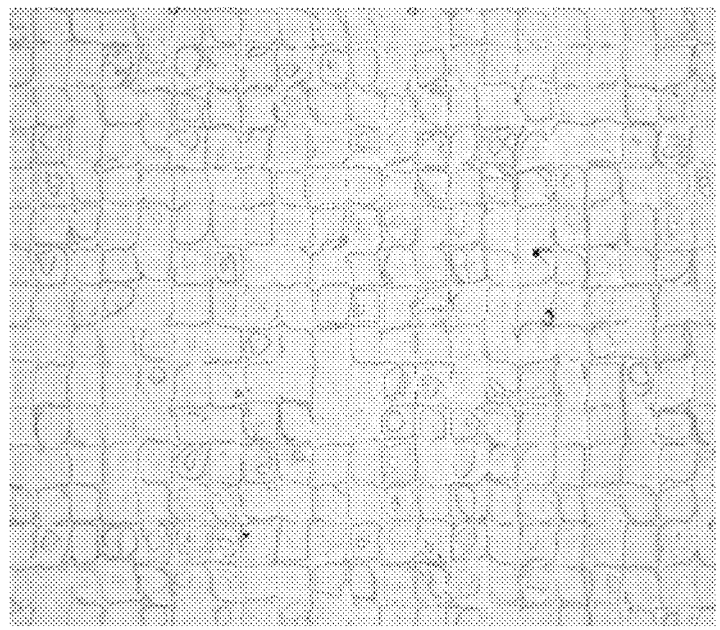
FIG. 3 illustrates an extremely close up optical image of the microstructure of annealed Nb C103 that has been printed using the additive manufacturing techniques taught herein.

FIG. 3 illustrates an extremely close up optical image of the microstructure of annealed Nb C103 that has been printed using the additive manufacturing techniques taught herein.

Figure 4:
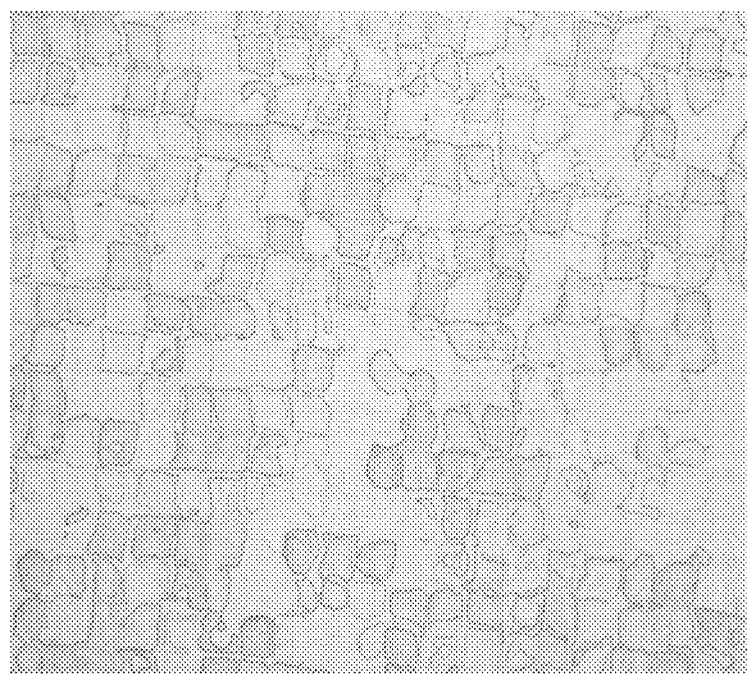
FIG. 4. Illustrates an extremely close up optical image of the microstructure of Nb C103 that has been printed using the additive manufacturing techniques taught herein after heating at 2,900° F. for two hours.

FIG. 4 illustrates the material of FIG. 3 after heating 2,900° F. for two hours. As may be seen in FIG. 4, the printed microstructure remains intact. In FIG. 4, there is no grain growth. The lack of grain growth means there is a stable microstructure and thus, stable mechanical properties.

The Nb C103 that has been printed with the methods taught herein has shown amazingly high temperature grain stability that is not naturally found in refractory alloys. In addition, testing has revealed that refractory alloys that are printed with the techniques taught herein show exceptional tensile strength at elevated temperature while remaining ductile.

As just one example of the better strength retention, at 2,400° F., NB C103 printed with the techniques taught herein with dispersoids, exhibited 1.8 times higher strength than the wrought counterpart.

In preferred embodiments, a process for additive manufacturing of an oxide and/or nitride enriched metal alloy powder, is provided. In preferred embodiments, the process comprises: (a) providing an oxide and/or nitride enriched metal powder precursor containing one or more metals oxides or nitrides; (b) exposing a first amount of said oxide and/or nitride enriched metal alloy powder to a transient moving energy source for melting and solidifying a first layer, and layer by layer thereafter. The oxide and/or nitrides added to the metal alloy powder generates dispersoids within the metal alloy when subjected to the transient energy source of the additive manufacturing process. The resulting metal alloy has a microstructure with oxide and nitride dispersoids.

In preferred embodiments, additional oxygen or nitrogen are added, or the levels available are maintained at a constant or elevated level, during the entire additive manufacturing process. Adding and/or maintaining higher levels of Oxygen or Nitrogen during the additive manufacturing process causes very stable oxides or nitrides to form in the material. These oxides and nitrides dispersoids form during the high temperature melting process where certain elements react to the oxygen and/or nitrogen to form the fine oxides and nitrides particles that rapidly solidify. These dispersoids are dispersed in the solid solution to provide the higher temperature stability and the extra strength in the material when it cools. The process forms in-situ oxides or nitrides and distributes them evenly/depreciatively throughout the solid solution matrix to stabilize materials at elevated temperatures and provided strength at temperature.

In preferred embodiments, the dispersoids have diameters in the range of 1 micron to 10 microns. In an even more preferred embodiment, the dispersoids have diameters in the range of 1 micron to 5 microns. In yet and even more preferred embodiment, the dispersoids have diameters in the range of 2 microns to 5 microns.

The elevated nitrogen or oxygen are preferably maintained during the entire additive manufacturing process. Adding nitrogen or oxygen during the additive manufacturing process is completely against the normal thinking in the industry and the resulting strengthening that occurs is an unexpected result. Typically, the entire additive manufacturing process (printing process) is performed in an inert gas to protect the metal from coming in contact with and reacting with oxygen, or to lessor degree nitrogen.

Alloys have strengthening elements such as Titanium and Aluminum, which have a high affinity to oxygen and once exposed to oxygen, oxides form and, these oxides neutralize the effectiveness of the strengthening elements.

However, despite the industry knowledge that you should remove oxygen, and potentially nitrogen in some cases, from the additive manufacturing process, the present inventor hereof has discovered that a constant supply of oxygen and/or nitrogen can be beneficial to the strength of the material.

In the embodiments taught herein, a higher volume or fraction of fine oxides is promoted (as long as they are stable oxides and are distributed evenly/discursively). These can act to pin the dislocation/grain boundary movement to prevent grain growth in size when exposed to high temperature and accordingly, result in a stronger material.

This invention also has implications for the manufacture of powders for use in the additive manufacturing process. Currently, the manufacture of powders for use with the additive manufacturing process is focused on, and struggling with, the reduction of oxygen content in the powders.

With the new additive manufacturing processes disclosed herein, gas atomized, powders with higher oxygen and/or nitrogen content can be used.

Currently, due to the reactivity of the refractory alloys, the standard process of gas atomization produced powders has 400 ppm-450 ppm oxygen or higher. The Aerospace Material Specification list the requirements of oxygen, nitrogen and niobium alloy bars, rods and extrusions at 225 ppm maximum for oxygen and 150 ppm maximum for nitrogen. Accordingly, the powders are already out of specification and powder producers are constantly trying to reduce the oxygen and nitrogen contents.

The powder manufacturing process is struggling to reduce oxygen in the powders to meet the specification requirements. With the invention of the new additive manufacturing processes disclosed herein, powder producers could increase oxygen/nitrogen in the powders to achieve our goal. In preferred embodiments, powders for use in the additive manufacturing process could have oxygen contents greater than 250 ppm. In yet other embodiments, the powders could have oxygen content in the range of between 500 ppm and 1000 ppm. In yet other embodiments, the powders could have an oxygen content of 500 ppm or greater. In yet other embodiments, the powders could have an oxygen content between 500 ppm and 3000 ppm. In yet other embodiments, the powders could have greater than 500 ppm Oxygen. In yet other embodiments, the powders could have between 1000 ppm and 2000 ppm oxygen. In other embodiments, the powder could have 1000 ppm plus or minus 100 ppm. In yet other embodiments, the powders could have between 500 ppm and 1500 ppm. In yet other embodiments, the oxygen content could be between 750 ppm and 1500 ppm. In still yet other embodiments, the oxygen content could be between 750 ppm and 2500 ppm.

In preferred embodiments, the nitrogen content in pretreated powder may be 50% of the oxygen levels disclosed above. In preferred embodiments, powders for use in the additive manufacturing process could have nitrogen contents greater than 125 ppm. In yet other embodiments, the powders could have nitrogen content in the range of between 250 ppm and 500 ppm. In yet other embodiments, the powders could have a nitrogen content of 250 ppm or greater. In yet other embodiments, the powders could have a nitrogen content between 250 ppm and 1500 ppm. In yet other embodiments, the powders could have greater than 250 ppm of nitrogen. In yet other embodiments, the powders could have between 500 ppm and 1000 ppm nitrogen. In other embodiments, the powder could have 500 ppm plus or minus 50 ppm. In yet other embodiments, the powders could have between 250 ppm and 750 ppm. In yet other embodiments, the nitrogen content could be between 375 ppm and 750 ppm. In still yet other embodiments, the nitrogen content could be between 375 ppm and 1250 ppm.

In preferred embodiments, 0.05% to 0.2% oxygen, which is 500 ppm to 2000 ppm in the processing gas, was used. Using 0.05% to 0.2% oxygen in the processing gas resulted in 700 ppm in the sold solution or higher. Maintaining this elevated level of oxygen during the entire additive manufacturing process has resulted in a stronger final material. However, in other embodiments other elevated levels of oxygen can be used including anything greater than 0%. In some embodiments, between 0 and 0.2% is used. In other embodiments, between 0 and 1% oxygen may be used. In yet other embodiments, between 0.1% and 0.3% may be used. In still yet other embodiments, between 0.1% and 0.5% may be used. In still yet other embodiments between 0% and 3% may be used.

In preferred embodiments, the nitrogen content in the environmentally controlled portion of the additive manufacturing machine may be 50% of the oxygen levels disclosed above. In preferred embodiments, 0.025% to 0.1% nitrogen, which is 250 ppm to 1000 ppm in the processing gas, was used. Using 0.025% to 0.1% nitrogen in the processing gas resulted in 350 ppm in the sold solution or higher. Maintaining this elevated level of nitrogen during the entire additive manufacturing process has resulted in a stronger final material. However, in other embodiments, other elevated levels of nitrogen can be used including anything great that 0%. In some embodiments, between 0 and 0.1% is used. In other embodiments, between 0 and 0.5% nitrogen may be used. In yet other embodiments, between 0.05% and 0.15% may be used. In still yet other embodiments, between 0.05% and 0.25% may be used. In still yet other embodiments between 0% and 1.5% may be used.

In preferred embodiments, pretreatment of nominal metal powder under an oxygen and/or nitrogen environment above activation energy occurs to form a layer of surface oxide or nitride. After pretreated the metal powders are exposed to a transient energy source for melting and solidifying in an inert and/or oxygen and/or nitrogen partial pressure environment.

In some embodiments, pretreatment of the metal powders includes applying a heat source or heating the powders for a period of time. In preferred embodiments, the metal powders are heated, between 250° F. and 750° F. Even more preferably the metal powders are heated between 400° F. and 600° F. and even more preferably between 450° F. and 600° F. The application of heat to the powders as part of the pretreatment process accelerates oxidation.

In preferred embodiments, the additional heat is applied to the powder during the pretreatment stage between 20 minutes and 120 minutes. Even more preferably, the heat is applied between 40 minutes and 120 minutes. Ideally, the heat is applied for at least 60 minutes at a minimum.

In yet other embodiments, nominal metal powders (without pretreatments of enriching with oxygen and nitrogen) are exposed to a transient energy source for melting and solidifying in an oxygen and/or nitrogen partial pressure environment. The environment may be maintained with higher levels of oxygen and/or nitrogen as taught herein.

Although the examples used herein are directed to Nb C103, any refractory metal and/or refractory metal alloy may be used without departing from the scope of the present inventions.

What is claimed is:

1. A method of fabricating an object from refractory powder alloys using additive manufacturing comprising:

(a) selecting a refractory alloy powder from the group consisting of Niobium alloy powder, Rhenium alloy powder, Tantalum refractory alloy powder, Molybdenum refractory alloy powder and Tungsten refractory alloy powder;

(b) pretreating the powder by heating the powder in an oxygen and nitrogen containing atmosphere at a temperature of between about 250° F. to about 750° F. for a period of between about 20 to 120 minutes to increase the oxygen content to between 500 ppm and 3000 ppm or to increase the nitrogen content in the powder to between 250 ppm and 1500 ppm;

(c) transferring the pre-treated powder to an additive manufacturing machine;

(d) depositing a layer of the pre-treated refractory alloy powder in an environmentally controlled chamber within an additive manufacturing machine;

(e) adjusting the environmentally controlled chamber to have between 500 ppm and 2000 ppm oxygen;

(f) passing a transient moving energy source for melting and solidifying the layer; and (g) wherein dispersoids are formed in situ in the layer with diameters between 1 micron and 10 microns.

2. The method of claim 1, further comprising adjusting the environmentally controlled chamber to be between 250 ppm and 1000 ppm nitrogen.

3. The method of claim 1, wherein the refractory alloy powder is Niobium refractory alloy powder.

4. The method of claim 1, wherein the refractory alloy powder is Tungsten refractory alloy powder.

5. The method of claim 1, wherein the refractory alloy powder is Rhenium refractory alloy powder.

6. The method of claim 1, wherein the refractory alloy powder is Tantalum refractory alloy powder.

7. The method of claim 1, wherein the refractory alloy powder is Molybdenum refractory alloy powder.

8. The method of claim 1, wherein the oxygen content in the pre-treated powder is adjusted to between 750 ppm and 1500 ppm.

9. The method of claim 1 which further comprises:

repeating steps (c) through (f) sequentially until the object is fabricated.

10. The method of claim 1 wherein the Niobium refractory alloy powder is Nb C103.

* * * * *